United States Patent Office 3,120,995
Patented Feb. 11, 1964

3,120,995
PRODUCTION OF HIGH GRADE MANGANOUS CHLORIDE FROM ORES OF MANGANESE DIOXIDE
Gary F. Hawkins and Charles E. Osborne, Kingsport, Tenn., assignors to Eastman Kodak Company, Rochester, N.Y., a corporation of New Jersey
No Drawing. Filed Jan. 31, 1962, Ser. No. 170,238
2 Claims. (Cl. 23—87)

This invention relates to the production of manganous chloride of high purity from manganese dioxide ore.

Previous methods of making manganous chloride have been lacking in some respects in that they are not productive of a product of relatively high purity.

An object of the present invention is the production of high purity manganous chloride from commercial manganese dioxide ore.

In accordance with the invention, commercial manganese dioxide preferably in comminuted form, is slurried under reflux with dilute hydrochloric acid of such strength that there is no appreciable reaction of the manganese dioxide. This operation permits separation of a large percentage of the alkali and alkaline earth salts which are the impurities it is desired to particularly remove. This leached ore is then treated with concentrated hydrochloric acid which converts the manganese dioxide to manganous chloride with the evolution of chlorine. The other metallic salts present in the ore are also thus converted to their chlorides, but siliceous material remains unreacted and are filtered off at this point. Then manganous carbonate or ore in which the manganese dioxide has been reduced to manganous oxide is added to neutralize excess hydrochloric acid and this results in precipitating any iron and aluminum present as iron and aluminum hydroxides. Then manganese metal is added to the solution or the solution is passed over a bed of manganese metal. Due to the position of manganese in the electromotive force series, common metals other than aluminum, alkali metals and alkaline earths are reduced to their metallic state by oxidation of the manganese. Either pure manganese or ferromanganese may be used for this oxidation, but ferromanganese does not remove impurities as rapidly as pure metal. An alternate procedure is to use manganese metal both for neutralization of the acid as well as replacement of metal impurities. Manganous sulfate or sulfuric acid is added to precipitate barium, the solution is filtered and the filtrate is evaporated to dryness at atmospheric pressure.

The manganous chloride retains water of hydration up to ca. 200° C. If hydrated manganous chloride is heated in air above 200° C. to remove water of hydration there is some formation of basic manganese chloride and manganese oxide which may be analyzed, after drying, as manganese oxide. To preclude formation of such compounds, the hydrated manganous chloride is heated at 550–650° C. in a stream of hydrogen chloride. In this step, some residual aluminum chloride is sublimed from the product. The final product thus obtained contains greater than 98% manganous chloride and only trace amounts of impurities.

The invention is further illustrated in the following examples:

Example 1

One hundred parts of ground manganese dioxide ore (84% manganese dioxide) were refluxed with 500 parts of 1.2% aqueous hydrochloric acid for 45 minutes. The slurry was filtered and the ore washed acid free. The filtrate was evaporated to dryness yielding 5.8 parts solid containing 0.37 part manganese, 0.75 part calcium and 0.003 part magnesium. The leached ore was added to 400 parts 38% hydrochloric acid and refluxed for one hour. An additional 5 parts of 38% hydrochloric acid were added twice; refluxing for 10 minutes was carried out after each addition. The solution was filtered; there were seven parts of dried precipitate. The filtrate was heated at 95–100° C. and 19.5 parts of manganese carbonate were added. The pH at this point was about 3. Then four parts of smaller than 35 mesh manganese were added; the pH rose to about 6. The mixture was stirred and let cool over a period of 40 minutes and then filtered. The precipitate contained 1.72 parts manganese. The filtrate was heated to 95° C. and one part manganese sulfate monohydrate was added. The solution was filtered yielding 0.8 part barium sulfate. The filtrate was evaporated to dryness to give 166 parts of hydrated manganous chloride. Fifty parts of the product were heated for 40 minutes in a hydrogen chloride stream at 550–600° C. to yield 42 parts of anhydrous manganous chloride showing that the total yield of anhydrous product in this run would be 139 parts.

Analysis showed the product to be 98.28% manganous chloride, 0.024% sodium, 0.132% potassium, 0.096% calcium, 0.068% manganesium, 0.007% aluminum, 0.00% iron, 0.0045% nickel, 0.0045% heavy metals as lead, 0.52% water and 0.095% manganous oxide.

Example 2

One hundred parts of Moroccan manganese dioxide ore, ground to pass a 20-mesh sieve, were refluxed one hour with 400 parts water and 20 parts 38% hydrochloric acid. The mixture was filtered and the filtrate was evaporated to yield 4.1 parts residue. The leached ore was reacted with hydrochloric acid until only a small residue of black manganese dioxide remained. The slurry was boiled, removing water, until all manganese dioxide had reacted. Ground manganese metal was added until the pH reached approximately 6; 8.3 parts manganese were required. The slurry was filtered. The precipitate contained 5.7 parts solid insoluble in hydrochloric acid and 13.2 parts material acid soluble. The filtrate was heated to boiling and a small amount of sulfuric acid was added; the solution was filtered yielding 1.4 parts barium sulfate. The filtrate was evaporated to dryness and the residue heated in a hydrogen chloride atmosphere at 650° C.

The analysis of the dried product showed 98.0% manganous chloride, 0.036% sodium, 0.194% potassium, 0.064% calcium, 0.102% magnesium, 0.005% aluminum, 0.00% iron, 0.002% nickel, 0.003% heavy metals as lead, 0.45% water and 0.06% manganous oxide.

Example 3

One hundred parts of ground manganese dioxide ore, 52.58% manganese, were leached with dilute hydrochloric acid as in Example 1. The leach liquid was evaporated to dryness to give 5.5 parts of solid containing 0.61 part calcium and 0.061 part magnesium.

The leached ore was added to 410 parts of 38% hydrochloric acid at room temperature. The solution was refluxed for one hour and 19 parts manganous carbonate and one part manganous sulfate monohydrate were added. Then smaller than 20-mesh ferromanganese, 74–76% manganese, was added. A total of 15 parts ferromanganese and a total of 11.3 hours reflux were necessary to precipitate a large part of the metals lying below manganese in the electromotive force series. The mixture was filtered and the filtrate was evaporated to dryness to yield 169.5 parts of hydrated manganous chloride. Fifty parts of this product were dried at 550–600° C. in a hydrogen chloride stream for one hour; 39.5 parts of anhydrous material were obtained showing that there were 134.5 parts of anhydrous salt in the hydrated product. Analysis of the dried sample showed 98.60% manganous chloride, 0.029% sodium, 0.076% calcium, 0.164% potassium, 0.064% magnesium, 0.0058% aluminum, 0.054% heavy metals as lead, 0.25% nickel, 0.0066% iron and 0.15% manganous oxide.

*Example 4*

Two hundred parts of ground manganese dioxide ore (52.58% manganese) were leached as in Example 1. One-half of this leached ore was added to 410 parts 38% hydrochloric acid at 40–50° C. and the mixture was refluxed for 40 minutes. Then one part manganous sulfate monohydrate and 12 parts of ferromanganese, 74–76% manganese, were added and the mixture refluxed for 2¼ hours. The pH at this point was about three; there was a strong test for metal salt impurities. A total of 10 parts of 50–325 mesh manganese metal and 7¾ hours reflux were necessary to precipitate a large part of the metal salt impurities. The mixture was filtered and the filtrate evaporated to dryness to give 150.5 parts hydrated manganous chloride. Fifty parts of tht product were dried at 550–600° C. for one hour in a hydrogen chloride atmosphere. The yield of anhydrous product was 41 parts showing 124 parts of anhydrous salt in the hydrated material. The analysis of the anhydrous salt was 99.04% manganous chloride, 0.027% sodium, 0.080% calcium, 0.163% potassium, 0.075% magnesium, 0.0054% aluminum, 0.001% heavy metals as lead, 0.013% nickel, 0.0067% iron, 0.19% water and 0.30% manganous oxide.

*Example 5*

One-half of the leached ore referred to in Example 4 was added to 410 parts of 38% hydrochloric acid. The mixture was refluxed for 40 minutes and 18 parts of ore in which the manganese dioxide had been reduced to manganous oxide were added which raised the pH to between 1.5 and 2. Then one part manganous sulfate monohydrate was added. Addition of a total of 6 parts of 50–325 mesh manganese metal and heating the mixture at reflux for 2.2 hours were necessary to reduce the concentration of metal salt impurities to a low value. The mixture was filtered and the filtrate evaporated to dryness yielding 136 parts of hydrated manganous chloride. On drying, 50 parts of this product at 550–600° C. in a hydrogen chloride atmosphere for one hour, 46.3 parts of anhydrous manganous chloride were obtained showing there to be 126 parts of anhydrous material in the hydrated product. The analysis of the anhydrous salt was 97.59% manganous chloride, 0.036% sodium, 0.226% calcium, 0.215% potassium, 0.098% magnesium, 0.0057% aluminum, 0.0041% heavy metals as lead, 0.048% nickel, 0.0048% iron, 0.2% water and 0.24% manganous oxide.

*Example 6*

Three thousand five hundred parts of ground manganese dioxide ore, 52.58% manganese, were slurried with 8000 parts of water and 500 parts of 38% hydrochloric acid were added. The mixture was refluxed one hour and decanted through a filter. The ore was washed by decantation five times with 4000 parts water and added to 5800 parts 38% hydrochloric acid at 60–65° C. Then, over a period of 5.5 hours, 2850 parts of hydrogen chloride were passed into the solution; the temperature was maintained at 95–100° C. After the mixture had been refluxed for an additional 40 minutes, 300 parts of manganous carbonate containing 34% water were added at 80–90° C. Then 35 parts of manganous sulfate monohydrate and 500 parts of water were added to the mixture which was then refluxed for 3.5 hours with 150 parts of 50–325 mesh manganese metal. The mixture was filtered and the filtrate evaporated to dryness to give 4795 parts of hydrated manganous chloride. Two 50 part samples of this material were dried in a hydrogen chloride atmosphere at 550–600° C. for one hour; the average yield of anhydrous manganous chloride was 39.9 parts showing there to be 3820 parts of anhydrous manganous salt in the hydrated product. Analysis of the anhydrous product showed 98.97% manganous chloride, 0.161% sodium, 0.092% calcium, 0.190% potassium, 0.086% magnesium, 0.0088% aluminum, 0.0031% heavy metals as lead, 0.083% nickel, 0.0067% iron, 0.18% water and 0.25% manganous oxide.

*Example 7*

One hundred parts of ground manganese dioxide ore, 52.58% manganese, were leached and caused to react with 410 parts of 38% hydrochloric acid as in Example 3. Then 19.5 parts manganous carbonate were added at 80–90° C., the solution was filtered, and the precipitate washed well. The final amount of filtrate and washings was 590 parts. Two hundred forty parts of this solution were passed through a column of 55 parts of 20–40 mesh manganese metal. The effluent on evaporation yielded 68 parts of hydrated manganous chloride. Thirty-five parts of this product were dried in a hydrogen chloride atmosphere at 550–600° C. for one hour to give 28.5 parts of anhydrous salt showing there were 55.4 parts of anhydrous material in the hydrated manganous chloride. The analysis of the anhydrous salt was 99.91% manganous chloride, 0.034% sodium, 0.082% calcium, 0.162% potassium, 0.094% magnesium, 0.0054% aluminum, 0.0025% heavy metals as lead, 0.037% nickel, 0.0044% iron, 0.054% manganous oxide and 0.13% water.

*Example 8*

In order to demonstrate the formation of oxides from manganous chloride when dried in air rather than hydrogen chloride, 100 parts of the hydrated chloride prepared in Example 6 were dissolved in 150 parts 1% hydrochloric acid and evaporated to dryness to yield 91.0 g. hydrated salt. Then 50 parts of this product were dried in air at 300–350° C. for 1.5 hours to give 43.9 parts showing there to be 79.8 parts anhydrous material in the hydrated sample. Analysis of the dried sample showed 98.60% manganous chloride, 0.164% sodium, 0.091% calcium, 0.187% potassium, 0.094% magnesium, 0.0009% heavy metals as lead, 0.15% nickel, 0.0086% iron, 0.14% water and 0.66% manganous oxide.

This invention has been described in detail with particular reference to preferred embodiments thereof, but it will be understood that variations and modifications can be effected within the spirit and scope of the invention as described hereinabove and as defined in the appended claims.

We claim:

1. A process for preparing manganous chloride from manganese dioxide ores containing impurities as alkali and alkaline earth salts, siliceous compounds and other metal impurities, which comprises refluxing the manganese dioxide ore with dilute hydrochloric acid to remove alkali and alkaline earth salts contained in the ore, treating the leached ore with concentrated hydrochloric acid to convert the manganese dioxide to manganous chloride, separating the acid solution of manganous chloride from siliceous residues, neutralizing excess hydrochloric acid with an agent from the group consisting of manganese metal, manganous oxide and manganous carbonate, treating the solution with manganese metal to reduce salts of metals below manganese in the electromotive force series to their metallic state, adding a material from the group consisting of sulfuric acid and manganous sulfate to precipitate barium, removing the solids therefrom, evaporating the solution to dryness to obtain hydrated manganous chloride and heating the resulting hydrated manganous chloride product at approximately 550–650° C. in a stream of hydrogen chloride to produce manganous chloride of high purity.

2. A process for preparing manganous chloride from manganese dioxide ores containing impurities as alkali and alkaline earth salts, siliceous compounds and other metal impurities, which comprises refluxing 100 parts manganese dioxide ore with 500 parts of 1.2% hydrochloric acid for 45 minutes, filtering to remove alkali and alkaline earth salts contained in the ore, refluxing the leached ore with 400 parts of 38% hydrochloric acid for one hour to convert the manganese dioxide to manganous chloride, separating the acid solution of manganous chloride from siliceous residues, neutralizing excess hydrochloric acid with manganous oxide, thereby precipitating iron and aluminum hydroxide, treating the solution with manganese metal to reduce salts of metals below manganese in the electromotive force series to their metallic state, evaporating the solution to dryness and heating the hydrated manganous chloride product at 550–650° C. in a stream of hydrogen chloride to produce manganous chloride of high purity.

References Cited in the file of this patent

UNITED STATES PATENTS

| | | |
|---|---|---|
| 1,231,101 | Vadner | June 26, 1917 |
| 1,962,160 | Sweet et al. | June 12, 1934 |

OTHER REFERENCES

Bose et al.: Chemical Abstracts, volume 46, No. 11, page 4943 (June 10, 1952).

Mellor: Comprehensive Treatise on Inorganic and Theoretical Chemistry, volume 3, page 765 (1923); volume 12, pages 187, 189, 348 (1932). Longmans, Green and Company, New York.